United States Patent
Leboeuf (10) Patent No.: US 10,620,332 B2
(45) Date of Patent: Apr. 14, 2020

(54) SEISMIC DATA TILT ANGLE CORRECTION METHOD AND SYSTEM FOR MULTISENSOR STREAMER

(71) Applicant: SERCEL, Carquefou (FR)

(72) Inventor: Simon Leboeuf, Monnieres (FR)

(73) Assignee: SERCEL, Carquefou (FR)

( * ) Notice: Subject to any disclaimer, the term of this patent is extended or adjusted under 35 U.S.C. 154(b) by 312 days.

(21) Appl. No.: 15/687,947

(22) Filed: Aug. 28, 2017

(65) Prior Publication Data

US 2019/0064379 A1 Feb. 28, 2019

(51) Int. Cl.
*G01V 1/20* (2006.01)
*G01V 1/30* (2006.01)
(Continued)

(52) U.S. Cl.
CPC ............... *G01V 1/36* (2013.01); *G01V 1/201* (2013.01); *G01V 1/30* (2013.01); *G01V 1/38* (2013.01);
(Continued)

(58) Field of Classification Search
CPC .......... G01V 1/36; G01V 1/38; G01V 1/3817; G01V 1/201; G01V 1/30; G01V 2210/56
(Continued)

(56) References Cited

U.S. PATENT DOCUMENTS

| 6,430,105 | B1 | 8/2002 | Stephen |
| 2006/0133202 | A1 | 6/2006 | Tenghamn |
| 2016/0356906 | A1 | 12/2016 | Ozdemir et al. |

FOREIGN PATENT DOCUMENTS

| EP | 2824483 A1 | 1/2015 |
| EP | 3073297 A1 | 9/2016 |

OTHER PUBLICATIONS

Extended European Search Report, dated Feb. 1, 2019, for European Application No. 18306042.5.

*Primary Examiner* — Daniel L Murphy
(74) *Attorney, Agent, or Firm* — Patent Portfolio Builders PLLC (57) ABSTRACT

A method for rotating recorded seismic data. The method includes receiving raw seismic data recorded with a particle motion sensor located along a streamer; receiving vibrational data recorded by a gravity sensing sensor also located along the streamer; calculating an angle $\beta(t)$, defined by a Z axis of the particle motion sensor and a $Z_0$ axis of a global orthogonal system of coordinates, based on (1) an angle $\alpha(t)$, defined by a $Z_t$ axis of the gravity sensing sensor and the $Z_0$ axis, and (2) an angle $\theta(t)$ defined by the $Z_t$ axis and the Z axis, wherein the Z axis is part of a first local orthogonal system of coordinates attached to the particle motion sensor, the $Z_0$ axis is part of a global orthogonal system of coordinates attached to the earth, and the $Z_t$ axis is part of a second local orthogonal system of coordinates attached to the gravity sensing sensor; and correcting the raw seismic data by rotating the raw seismic data, recorded in the first local orthogonal system of coordinates, with the angle $\beta(t)$, to obtain corrected seismic data in the global orthogonal system of coordinates. The first and second local system of coordinates share a same X axis but the other two axes of each of the first and second local systems are offset from each other by angle $\theta(t)$ while the streamer moves in water and records the raw seismic data and the vibrational data. The global orthogonal system of coordinates share the same X axis with the first and second local systems, and the global orthogonal system is fixed to the earth while the first and second local systems rotate with the streamer.

19 Claims, 7 Drawing Sheets

(51) Int. Cl.
*G01V 1/36* (2006.01)
*G01V 1/38* (2006.01)
(52) U.S. Cl.
CPC ........ *G01V 1/3817* (2013.01); *G01V 2210/56* (2013.01)
(58) Field of Classification Search
USPC .......................................................... 367/21
See application file for complete search history.

SEISMIC DATA TILT ANGLE CORRECTION METHOD AND SYSTEM FOR MULTISENSOR STREAMER

BACKGROUND

Technical Field

Embodiments of the subject matter disclosed herein generally relate to methods and systems and, more particularly, to mechanisms and techniques for estimating a tilt angle of a particle motion sensor that is located on a seismic streamer and correcting seismic data recorded by the particle motion sensor.

Discussion of the Background

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

Figure 1:
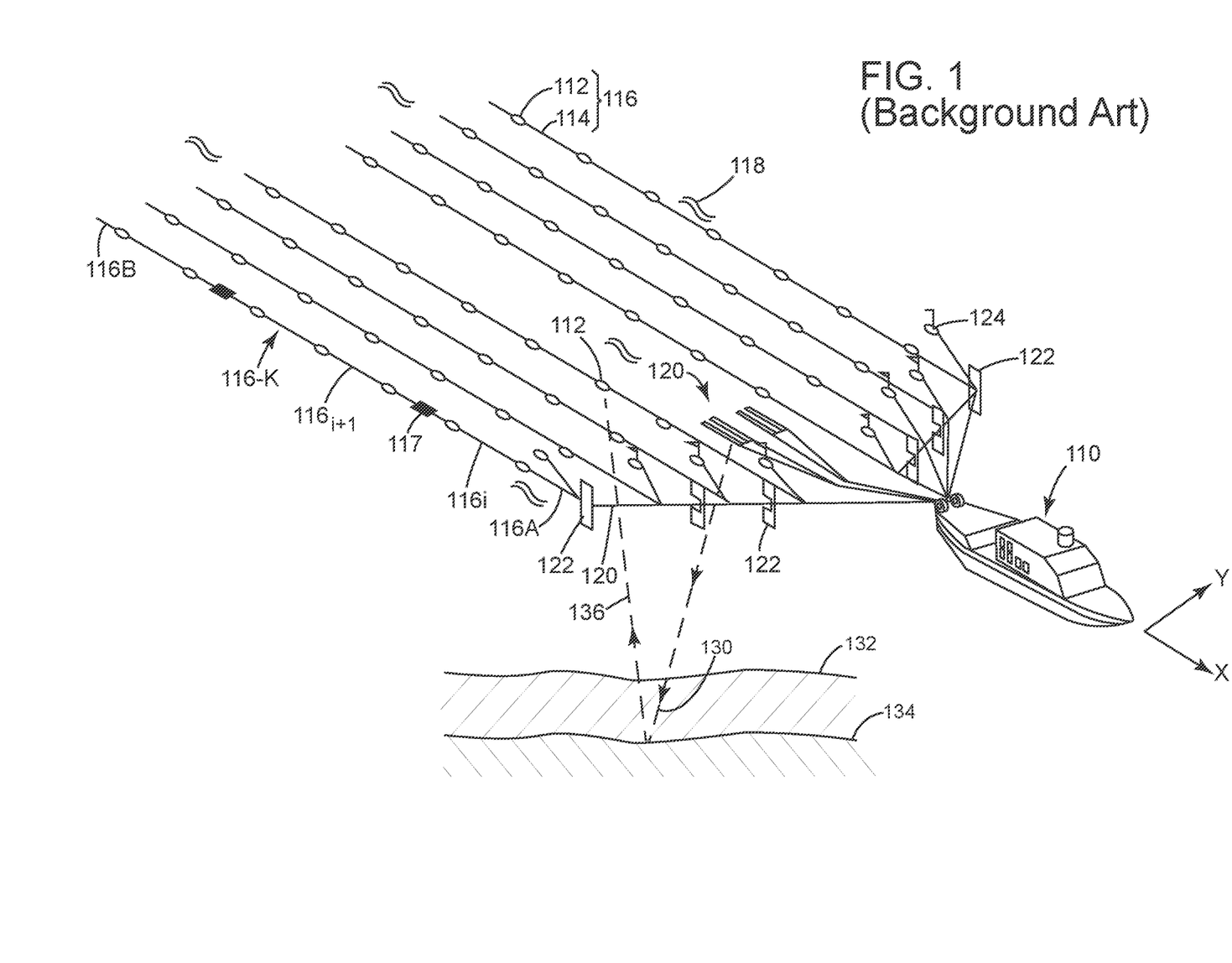
FIG. 1 is a schematic diagram of a conventional seismic data acquisition system having plural horizontal streamers.

During a seismic gathering process, as shown in FIG. 1, a vessel 110 tows plural sensors 112, which are disposed along a cable 114. Cable 114 together with its corresponding sensors 112 are sometimes referred to, by those skilled in the art, as a streamer 116. Vessel 110 may tow plural streamers 116 at the same time, as shown in the figure. The streamers may be disposed horizontally, i.e., lie at a constant depth relative to the ocean surface 118. Also, the plural streamers 116 may form a constant angle (i.e., the streamers may be slanted) with respect to the ocean surface or they may have a variable-depth profile (Broadseis, CGG). The totality of streamers and associated equipment (e.g., birds, deflectors, ropes) form a streamer spread.

Still with reference to FIG. 1, vessel 110 may also tow a seismic source array 120 configured to generate an acoustic wave 130. The acoustic wave 130 propagates downward and penetrates the seafloor 132, eventually being reflected by a reflecting structure 134. The reflected acoustic wave 136 propagates upward and is detected by sensors 112.

The streamers are towed by the vessel 110 along a pre-plot path X. Each streamer includes plural streamer sections. As an example, FIG. 1 shows a streamer 116-$k$, where k can vary between 1 and 30, having many sections connected to each other by a streamer connecting module 117. FIG. 1 labels, for simplicity, only two streamer sections 116$_i$ and 116$_{i+1}$ connected by module 117, where "i" can vary between 1 and 100. FIG. 1 also shows the streamer 116-$k$ having a head 116A and a tail 116B.

During the seismic acquisition phase, the streamers 116 are maintained with a certain offset from each other along the cross-line direction Y by using a combination of ropes 120 and deflectors 122 located at the head of the streamers, as shown in FIG. 1. Also, for maintaining a certain depth of the streamer heads 116A, one or more head buoys 124 are connected to corresponding streamer heads. Similar buoys (not shown), called tail buoys, are connected to the tail end 116B of the streamers.

One or more of the streamer sections may include different types of seismic sensors, for example, one or more pressure sensors and one or more particle motion sensors. This type of streamer section or streamer is called herein multi-sensor streamer. A pressure sensor may be a hydrophone while a particle motion sensor may be a geophone or an accelerometer or a fiber optic, etc. A pressure sensor is designed to measure a change in the ambient pressure (usually within the water) produced by the reflected seismic wave 136 while a particle motion sensor is designed to sense a change in the motion of the particles of the ambient medium (usually water) due to the reflected seismic wave 136. The different types of sensors may be collocated within the streamer section.

A problem with the multi-sensor streamer is that while the pressure sensor is omnidirectional, i.e., it measures the same pressure irrespective of its orientation, the particle motion sensors measure is not. This means that the orientation of the particle motion sensor needs to be known in order to make sense of the measured speed or acceleration or displacement of the water particle. In other words, because the particle motion sensor measures an amplitude of a vector (displacement, velocity or acceleration), the angle between (1) the particle motion sensor's sensing axis (its orientation) and (2) the measured vector needs to be known.

Although during the manufacturing process of the streamer, the particle motion sensors have their sensing axis aligned with the gravity, it is nearly impossible to predict the rotation of the streamer when towed in water and thus, the asserted orientation of the particle motion sensor with the gravity is illusory during the seismic survey. There are two known solutions to determine the orientation of the particle motion sensor used today.

A first solution consists in mechanically insuring that the particle motion sensor is in a known orientation, using for example, the gravity. One way to perform this is to ballast the particle motion sensor and to mount the particle motion sensor on a gimbal system in a housing filled with a lubricant damping fluid.

This first solution has the main disadvantage of affecting the particle motion sensor response, as the motion of the sensor induced by the streamer's rotation is biased by the gimbal arrangement (inertia, friction, etc.). Moreover, such gimbal mounting is usually complex, because it involves additional mechanical parts, and takes too much space inside the streamer.

A second solution is to create a 2 or 3-dimension particle motion sensor and to use a nearly collocated tilt sensor, with a known orientation, compared to the particle motion sensor. The tilt measurement is then used to recover the vertical, the cross-line, or the inline component of the particle motion wave. This solution can, for example, be implemented through a MEMS ("micro-electro-mechanical system") device that can measure at the same time the tilt and the acceleration.

The main drawbacks of the use of a tilt sensor in addition to the particle motion sensor are:

a. The relative position of the tilt sensor compared to particle motion sensor needs to be known precisely. It requires a calibration procedure during the manufacturing process. This kind of procedure is often costly.

b. The angle between the tilt sensor's axis and the sensing axis of the particle motion sensor has to be constant. An angular bias created by mechanical stresses or aging of the streamers can appear during the lifetime of the streamer. This bias will lower the performances of the sensor (also known as vector fidelity). One way to counteract this issue is to periodically calibrate the streamer, which is expensive and undesirable.

Thus, there is a need to have a method that provides the particle motion sensor's orientation during the seismic survey without using expensive particle motion sensors or ineffective factory calibrations. Accordingly, it would be desirable to provide systems and methods with such capabilities.

SUMMARY

According to an embodiment, there is a method for rotating recorded seismic data. The method includes receiving raw seismic data recorded with a particle motion sensor located along a streamer; receiving vibrational data recorded by a gravity sensing sensor also located along the streamer; calculating an angle $\beta(t)$, defined by a Z axis of the particle motion sensor and a $Z_0$ axis of a global orthogonal system of coordinates, based on (1) an angle $\alpha(t)$, defined by a $Z_t$ axis of the gravity sensing sensor and the $Z_0$ axis, and (2) an angle $\theta(t)$ defined by the $Z_t$ axis and the Z axis, wherein the Z axis is part of a first local orthogonal system of coordinates attached to the particle motion sensor, the $Z_0$ axis is part of a global orthogonal system of coordinates attached to the earth, and the $Z_t$ axis is part of a second local orthogonal system of coordinates attached to the gravity sensing sensor; and correcting the raw seismic data by rotating the raw seismic data, recorded in the first local orthogonal system of coordinates, with the angle $\beta(t)$, to obtain corrected seismic data in the global orthogonal system of coordinates. The first and second local system of coordinates share a same X axis but the other two axes of each of the first and second local systems are offset from each other by angle $\theta(t)$ while the streamer moves in water and records the raw seismic data and the vibrational data. The global orthogonal system of coordinates share the same X axis with the first and second local systems, and the global orthogonal system is fixed to the earth while the first and second local systems rotate with the streamer.

According to another embodiment, there is a system for acquiring seismic data. The system includes a multi-sensor streamer having a particle motion sensor for recording seismic data and a gravity sensing sensor for recording vibrational data and a controller configured to calculate an angle $\beta(t)$, defined by a Z axis of the particle motion sensor and a $Z_0$ axis of a global orthogonal system of coordinates, based on (1) an angle $\alpha(t)$, defined by a $Z_t$ axis of the gravity sensing sensor and the $Z_0$ axis, and (2) an angle $\theta(t)$ defined by the $Z_t$ axis and the Z axis, wherein the Z axis is part of a first local orthogonal system of coordinates attached to the particle motion sensor, the $Z_0$ axis is part of a global orthogonal system of coordinates attached to the earth, and the $Z_t$ axis is part of a second local orthogonal system of coordinates attached to the gravity sensing sensor, and correct the raw seismic data by rotating the raw seismic data, recorded in the first local orthogonal system of coordinates, with the angle $\beta(t)$, to obtain corrected seismic data in the global orthogonal system of coordinates. The first and second local system of coordinates share a same X axis but the other two axes of each of the first and second local systems are offset from each other by angle $\theta(t)$ while the streamer moves in water and records the raw seismic data and the vibrational data. The global orthogonal system of coordinates share the same X axis with the first and second local systems, and the global orthogonal system is fixed to the earth while the first and second local systems rotate with the streamer.

According to still another embodiment, there is a system for acquiring seismic data and the system includes a multi-sensor streamer having a particle motion sensor for recording raw seismic data and a gravity sensing sensor for recording vibrational data; and a controller configured to calculate an angle $\beta(t)$, defined by a Z axis of the particle motion sensor and a $Z_0$ axis of a global orthogonal system of coordinates, based on (1) an angle $\alpha(t)$, defined by a $Z_t$ axis of the gravity sensing sensor and the $Z_0$ axis, and (2) an angle $\theta(t)$ defined by the $Z_t$ axis and the Z axis, wherein the Z axis is part of a first local orthogonal system of coordinates attached to the particle motion sensor, the $Z_0$ axis is part of a global orthogonal system of coordinates attached to the earth, and the $Z_t$ axis is part of a second local orthogonal system of coordinates attached to the gravity sensing sensor, and correct the raw seismic data by rotating the raw seismic data, recorded in the first local orthogonal system of coordinates, with the angle $\beta(t)$, to obtain corrected seismic data in the global orthogonal system of coordinates.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a streamer having two different types of seismic sensors. However, the embodiments to be discussed next are not limited to these seismic sensors or to two different types of seismic sensors. The principles of this invention may be applied to other types of streamers, for example, those that include only particle motion sensors.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Prior to discussing the novel solution for addressing the above-noted problems of the streamers having particle motion sensors, a brief discussion concerning the various causes that produce tilt in a streamer is now presented.

Figure 2A:
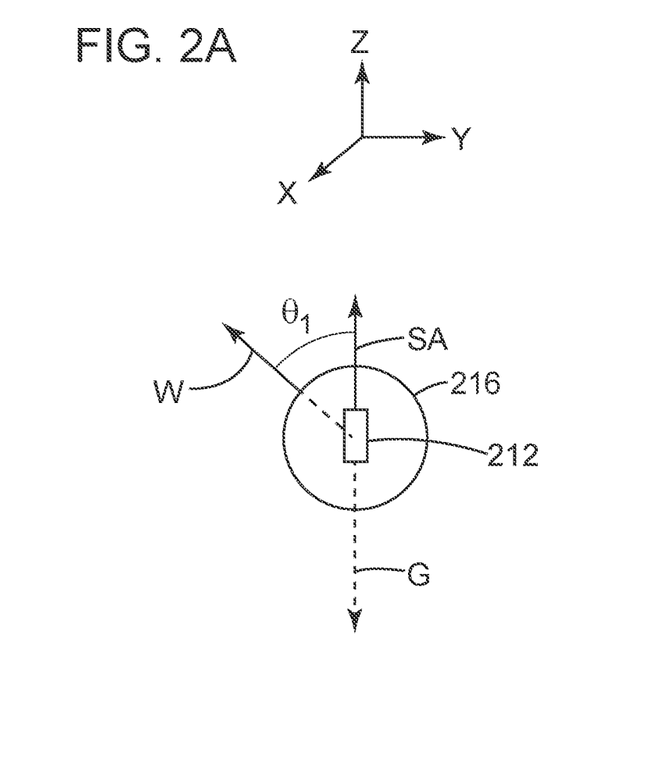
FIGS. 2A and 2B illustrate the orientation of a sensing axis of a particle motion sensor relative to gravity.
Figure 2B:
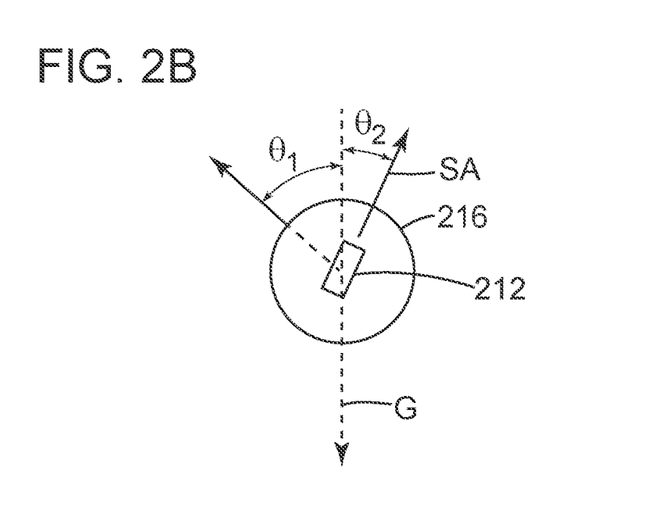

The seismic streamers are subject to several modes of vibration due to the action of ocean surface waves, tugging, external devices, current, etc. These vibrations are responsive for making the streamer, more precisely, various portions of the streamers, to move relative to each other so that the particle motion sensors located in these portions have their sensing axes pointing in various directions at the same instant. Unlike hydrophones that are by design insensitive to vibrations, a multi-sensor streamer comprises particle motion sensors that will pick up these vibration as noise. In other words, as illustrated in FIGS. 2A and 2B, a streamer 216 (a cross-section is shown in the figures) is shown having a particle motion sensor 212 located inside the streamer. A sensing axis SA of the particle motion sensor 212 is assumed, during the seismic survey, to be aligned (with a negative sign) with the gravity g as shown in FIG. 2A. Thus, a water particle movement along direction W, which is tilted with an angle $\theta_1$ relative to the sensing axis SA, when recorded with the particle motion sensor, can be correctly identified along the desired axes X, Y and Z. Axes X, Y, Z define an inertial system of reference, i.e., a system attached to the earth and supposed to be fixed during the entire seismic acquisition process. However, due to the various vibrations discussed above, the streamer 216 turns and moves up and down and left and right so that the actual sensing axis SA of the particle motion sensor 212 makes an angle $\theta_2$ with the gravity g and this angle changes in time. By not being aware of angle $\theta_2$, the components of the particle motion or speed or acceleration along the desired axes X, Y and Z cannot be accurately be determined.

To be able to calculate this angle $\theta_2$, the various vibration modes in a seismic streamer need to be understood and estimated. The most important vibration modes for a streamer are:
1. Longitudinal vibrations,
2. Transverse vibrations, and
3. Angular vibrations.

The longitudinal vibrations (i.e., along the streamer) are not sensed for the vertical and crossline axes of the particle motion sensors because this motion is perpendicular to their sensing axis. Note that a 3-dimensional (3D) particle motion sensor has in fact one sensor for each direction, i.e., one sensor sensing along the X direction, which is assumed to coincide with the longitudinal axis of the streamer, one sensor sensing along the Y direction, which is assumed to be a line perpendicular to all the streamers, i.e., the cross-line direction, and one sensor sensing along the Z direction, which is assumed to be aligned with the gravity. Thus, the longitudinal vibrations, which are along axis X, are not impacting the particle motion sensing capabilities of the sensors along the Y and Z axes.

The transverse vibrations (in the YZ plane) will have large amplitudes in the low frequencies range, i.e., 1 Hz to about 30 Hz.

The angular vibrations (rotations of the streamer about its longitudinal axis X) could be sensed by the particle sensors if they are offset from the center of the streamer. The rotation of the streamer occurs mainly below 1 Hz.

In general, the transverse vibration is the strongest noise mode.

Figure 3:
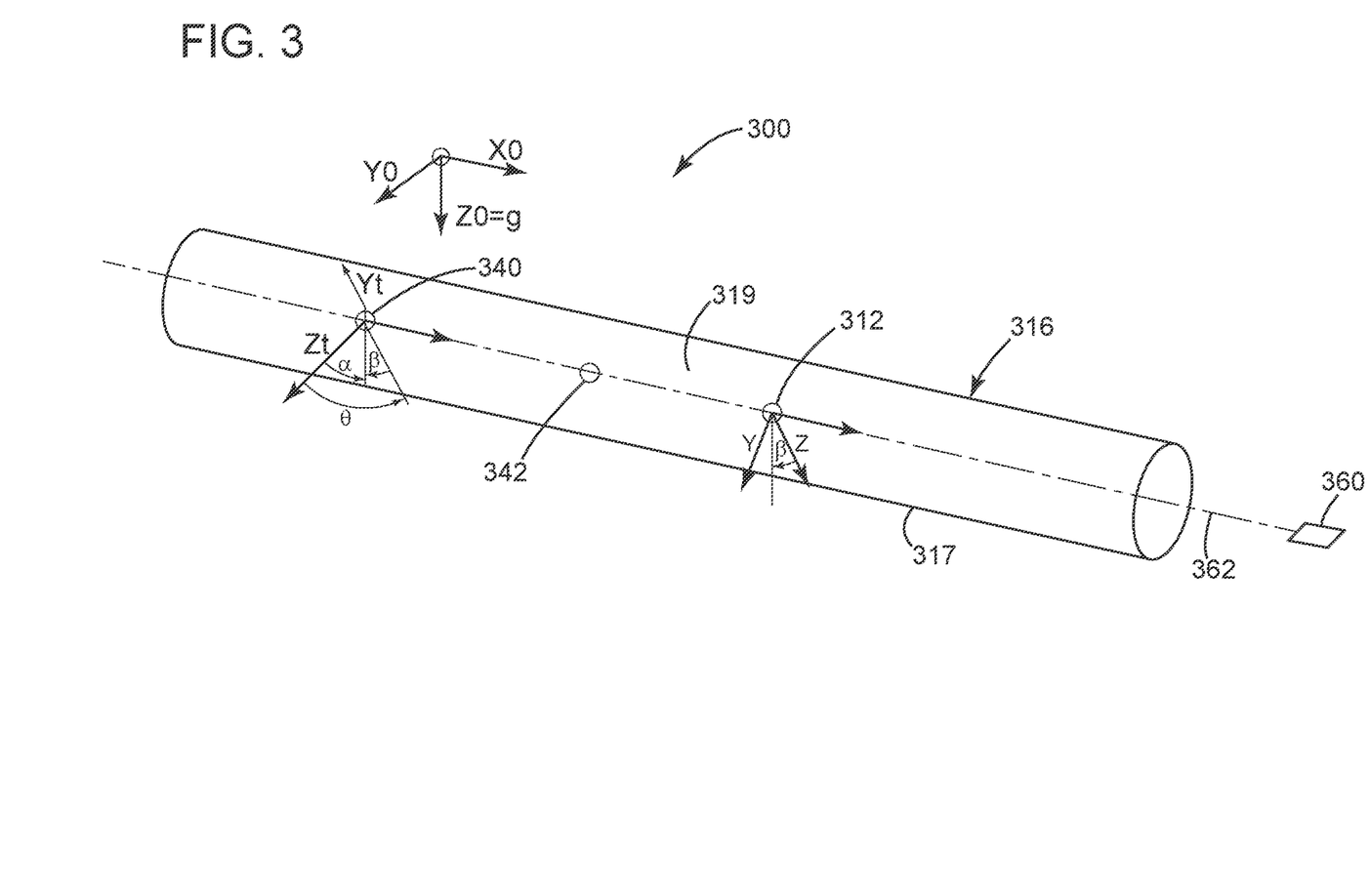
FIG. 3 illustrates a streamer having a particle motion sensor and a gravity sensing sensor.

According to an embodiment illustrated in FIG. 3, a 2 or 3-axis gravity sensing sensor 340 (e.g., accelerometer with a DC-response capability, like a MEMS accelerometer) is integrated in the streamer 316 so that, with adequate sampling rate, it will sense:
1) the variation of the projection of the gravity due to the rotation of the streamer; and
2) the transverse acceleration corresponding to the transverse vibrations of the streamer.

FIG. 3 shows a system 300 that includes a streamer 316, gravity sensing sensor 340, particle motion sensor 312, and a hydrophone 342. System 300 may also include a controller 360 that is connected through a communication link 362 to the gravity sensing sensor 340 and particle motion sensor 312. Controller 360 may be located on the streamer, inside the streamer, on the towing vessel, or distributed between the streamer and the towing vessel. Other type of sensors may be used for the particle motion sensor and/or hydrophone. FIG. 3 also shows streamer 316 having a skin 317 that prevents the ambient water to enter an inside chamber 319 of the streamer. The sensors noted above are located within the inside chamber 319 and they are connected to the communication link 362.

The gravity sensing sensor 340 is chosen so that it can sense the gravity acceleration with a good signal-to-noise (S/N) ratio. Note that the traditional particle motion sensors (accelerometers or geophones) are by design made so that they are not affected by the gravity, i.e., they do not measure the gravity. In this regard, although the gravity sensing sensor may be an accelerometer and the particle motion sensor may also be an accelerometer, these accelerometers are different from each other.

With this sensor configuration, as discussed later, the measured data from the gravity sensing sensor can be used to determine the angular position of the particle motion sensor, for example, with appropriate filtering techniques that are discussed later.

If the gravity sensing sensor is co-located with the particle motion sensor (which can be an accelerometer or a geophone), the two sensors will "see" the same transverse accelerations. The relative angular position between the two sensors can be measured using signal processing techniques, as also discussed later.

The angular position determined with the filtering techniques and the relative angular position determined with signal processing techniques can be combined to define the actual orientation or the sensing axis of the particle motion sensor. This processing may take place in the controller 360, which is located on the towing vessel, on the streamer, or distributed on the vessel and the streamer.

Figure 4:
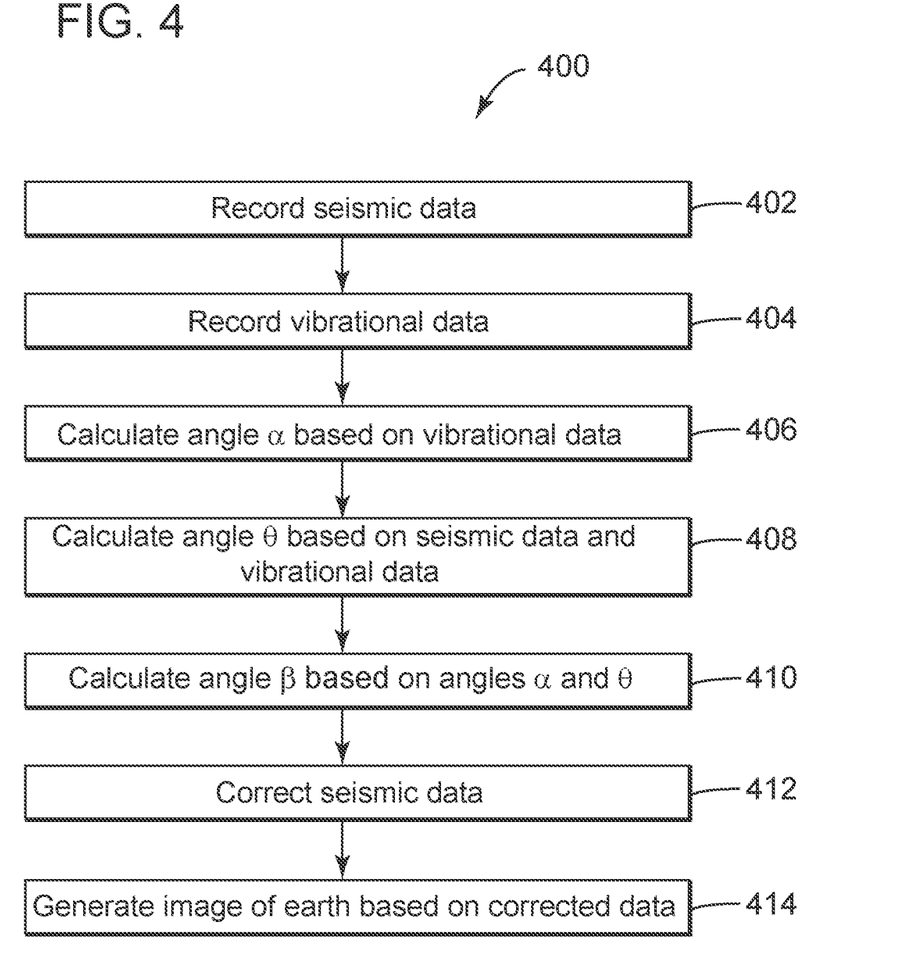
FIG. 4 is a flowchart of a method for correcting raw seismic data due to a tilt of a particle motion sensor.

A method for determining the actual orientation of the particle motion sensor is now discussed with regard to FIGS. 3 and 4. FIG. 3 shows the configuration of the sensors involved in the determination of the actual orientation of the particle motion sensor, but also the orthogonal system of coordinates associated with each sensor and the absolute reference system associated with the earth (i.e., inertial system of reference).

More specifically, FIG. 3 shows the earth-referenced orthonormal coordinate system $(X_0, Y_0, Z_0)$ with axis $Z_0$ pointing downwards, collinear with the gravity vector g. The seismic data recorded by each particle motion sensor 312 needs to be expressed in this common (or global) coordinate system so that the processing of the acquired seismic data can be performed. In the following, the streamer 316 is considered to be flat and collinear with the $X_0$ direction, i.e., the longitudinal axis of the streamer.

The gravity sensing sensor 340 has its own system of orthogonal coordinates $(X_t, Y_t, Z_t)$, where axis $X_t$ is selected (when the gravity sensing sensor is attached to the streamer) to be collinear with the longitudinal axis of the streamer (and with axis $X_0$). The gravity sensing sensor provides the accelerations for at least $Y_t$ and $Z_t$ directions, respectively $AccY_t(t)$ and $AccZ_t(t)$. FIG. 3 shows angle $\alpha(t)$ being the angle formed by axis $Z_t$ with $Z_0$. Note that if a parameter is represented in this document as being followed by the symbol "t," it means that this parameter varies in time.

The particle motion sensor 312 has its own system of orthogonal coordinates (X,Y,Z), where axis X is selected (when the particle motion sensor is attached to the streamer) to be collinear with the longitudinal axis of the streamer (and with axes $X_0$ and $X_t$). The particle motion sensor records the seismic data for Y and Z directions, i.e., PMSY(t) and PMSZ(t), respectively. Quantities PMSY and PMSZ can be displacements or velocities or accelerations.

Angle $\beta(t)$ is the angle formed by axis Z and axis $Z_0$ and angle $\theta(t)$ is the angle formed by axis $Z_t$ and Z. Therefore, the following relation is true, $$\theta = \alpha(t) - \beta(t). \tag{1}$$

Note that the raw seismic data is recorded in the (X,Y,Z) system and thus, angle $\beta(t)$ is necessary for rotating this data to the earth's system of reference $(X_0, Y_0, Z_0)$, where the processing is taking place.

If angle $\beta(t)$ can accurately be determined, then the particle motion related data can be transformed from the coordinate system (X,Y,Z) to the inertial reference coordinate system $(X_0, Y_0, Z_0)$ based on the following equation:

$$\begin{pmatrix} PMSY_0(t) \\ PMSZ_0(t) \end{pmatrix} = \begin{pmatrix} \cos \beta(t) & \sin \beta(t) \\ -\sin \beta(t) & \cos \beta(t) \end{pmatrix} \cdot \begin{pmatrix} PMSY(t) \\ PMSZ(t) \end{pmatrix}. \tag{2}$$

As will be discussed now, angle $\beta(t)$ necessary for this transformation can be determined by successively measuring angles $\alpha(t)$ and $\theta(t)$.

FIG. 4 is a flowchart of a method for transforming the raw seismic data recorded with the particle motion sensor 312, from the local reference system (X,Y,Z) to the global coordinate system $(X_0, Y_0, Z_0)$. The method 400 includes a step 402 of recording (or receiving) seismic data with the particle motion sensor 312 and a step 404 of recording (or receiving) vibrational data with the gravity sensing sensor 340. In step 406, the angle $\alpha(t)$ is calculated using a filtering technique applied to the recorded vibrational data, e.g., temporal filtering or frequency-wavenumber filtering, and in step 408 the angle $\theta(t)$ is calculated using a signal processing technique applied both to the recorded raw seismic data and recorded vibrational data. Then, in step 410 the angle $\beta(t)$ is calculated based on equation (1) and in step 412 the recorded raw-data is rotated/corrected based on equation (2) for aligning it with the global reference system and removing the tilt generated by the vibrations of the streamer. Finally, in step 414 various processing techniques are applied to the corrected data for generating an image of the subsurface. Such image is more accurate than the existing techniques that rotate the raw seismic data with the traditional methods. Some of the steps discussed with regard to FIG. 4 are now discussed in more detail.

Step 406 of calculating the angle $\alpha(t)$ between the $Z_t$ axis (local axis for gravity sensing sensor 340) and the Z axis (global axis for the entire system) can use a filtering technique. Two filtering techniques are now discussed, but those skilled in the art would understand that other techniques may also be applied.

The acceleration recorded by the gravity sensing sensor 340 along the $Y_t$ and $Z_t$ axes has two components, a first component AccGrav due to the acceleration related to the gravity and a second component AccTrans due to the acceleration of the streamer due to the transverse motion of the streamer. Note that the traditional particle motion sensor would not be able to detect the first component, only the second component. However, in one embodiment, it is possible to have particle motion sensors that are capable of measuring the acceleration due to the gravity and for this specific case, the gravity sensing sensor can be one of the particle motion sensors. For this particular case, there is no need for two types of sensors for determining the orientation of sensor 312. However, at the current time, the particle motion sensors used in the seismic industry cannot record the acceleration of the streamer due to the gravity.

The acceleration recorded by the gravity sensing sensor 340, i.e., the vibrational data, is as follows:

$$\begin{cases} AccY_t(t) = AccGravY_t + AccTransY_t(t) \\ AccZ_t(t) = AccGravZ_t + AccTransZ_t(t) \end{cases}, \tag{3}$$

where AccGrav is the acceleration related to the gravity, i.e., $$\begin{cases} AccGravY_t = g \sin \alpha(t) \\ AccGravZ_t = g \cos \alpha(t) \end{cases}. \tag{4}$$

Thus, angle $\alpha(t)$ can be calculated, if the acceleration related to the gravity is known, based on the following equation:

$$\alpha(t) = \tan^{-1} \frac{AccGravY_t}{AvvGravZ_t}. \tag{5}$$

A first technique for calculating the angle $\alpha(t)$ is the temporal filtering. According to this technique, the angle $\alpha(t)$ can be determined using only the local data (i.e., vibrational data measured with one gravity sensing sensor 340) and applying a temporal filter. The analysis of actual data has shown that accelerations related to the gravity (and therefore the rotation motion) dominates below 1 Hz and accelerations related to the transverse motion dominate above this frequency. This means that the locally recorded data may be filtered with a low pass filter to remove all the information having a frequency above 1 Hz (or 2 or 3 or 4 or 5 Hz), so that, the information that is left, is representative only of the acceleration due to the gravity and not the acceleration due to the transverse motion of the streamer. By applying the low pass filter, it is then possible to estimate the angle $\alpha(t)$ as follows:

$$\hat{\alpha}(t) = \tan^{-1} \frac{LowPassFilt(AccY_t)}{LowPassFilt(AccZ_t)}, \tag{6}$$

where the hat above the angle $\alpha(t)$ means that its value has been calculated. The low pass filter may be an infinite impulse response (IIR) filter, or a finite impulse response (FIR) filter or a mean filter with a cut-off frequency around 1 Hz or another frequency in the range of zero to five.

A second technique for calculating the angle $\alpha(t)$ is the FK filtering, i.e., applying a filter in the frequency-wavenumber domain. According to this technique, angular vibrations (or torsional) waves and transverse vibrations waves are travelling with different phase velocities. Using a plurality of spatially regularly distributed sensors (i.e., gravity sensing sensors) along the streamer, it is possible to separate the two resulting acceleration signals (gravity and vibrations) by using a F-K filter with a given mask.

Figure 5:
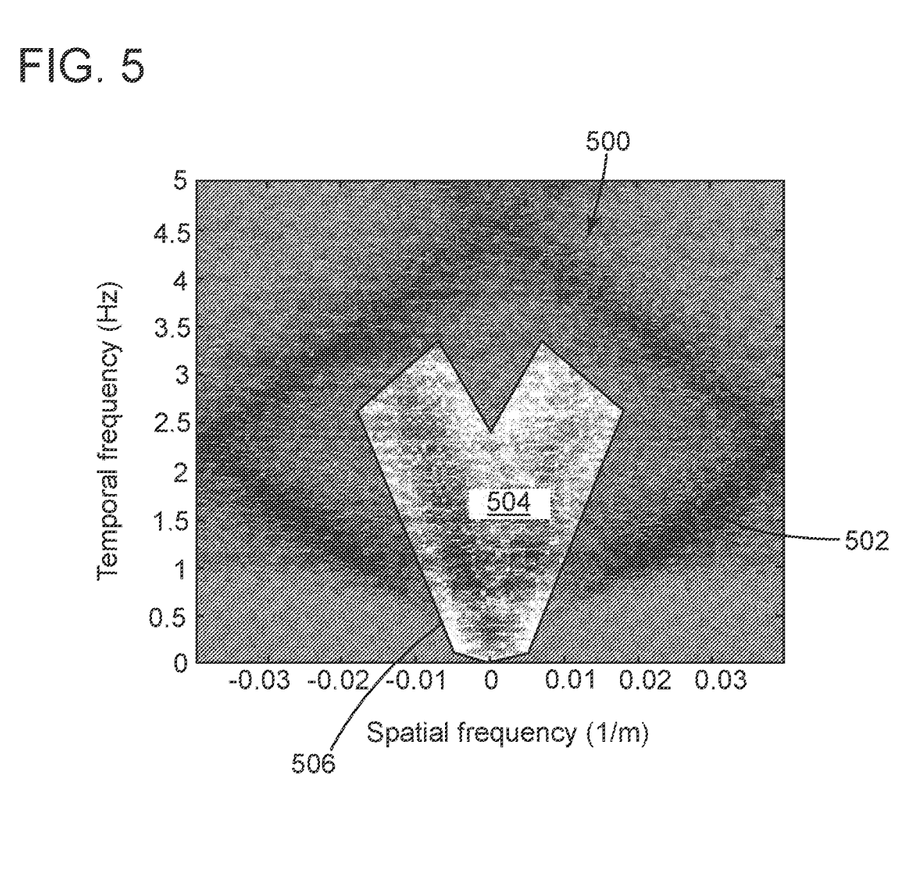
FIG. 5 is a mask that may be used for calculating a tilt angle.

In one application, the angle is given by equation:

$$\hat{\alpha}(t) = \tan^{-1} \frac{FKFilt(AccY_t)}{FKFilt(AccZ_t)}, \tag{7}$$

where the filter FKFilt is a FK filter. A possible mask 500 to be used with this filter is illustrated in FIG. 5. FIG. 5 shows an FK diagram of a crossline dataset (data recorded with plural gravity sensing sensors) in which data 502 corresponds to the transverse motion of the streamer and data 504, within area 506 in the figure, corresponds to the gravity. Mask 500 removes data 502 and allows only data 504, which is used in equation (7) for calculating the angle. Data 502 and 504 can be separated because of their different phase velocities. Those skilled in the art, with the benefit of the two techniques discussed above, would be empowered to devise other filters for achieving the same results.

Next, a signal processing techniques that may be used in step 408 for calculating angle θ(t) is discussed. Angle θ(t), as illustrated in FIG. 3, describes the angle difference between the $Z_t$ axis of the gravity sensing sensor 340 and the Z axis of the particle motion sensor 312. If these two sensors are located close to each other, e.g., a distance between sensor 340 and sensor 342 is about 0.2 to 2 m and a distance between sensor 342 and sensor 312 is also about 0.2 to 2 m, then angle θ(t) is an almost constant angle as two adjacent portions of the streamer to which the sensors are attached are unlikely to rotate relative to each other. For this reason, this embodiment assumes that the gravity sensing sensor and the particle motion sensor are subject to the same transverse accelerations.

Figure 6:
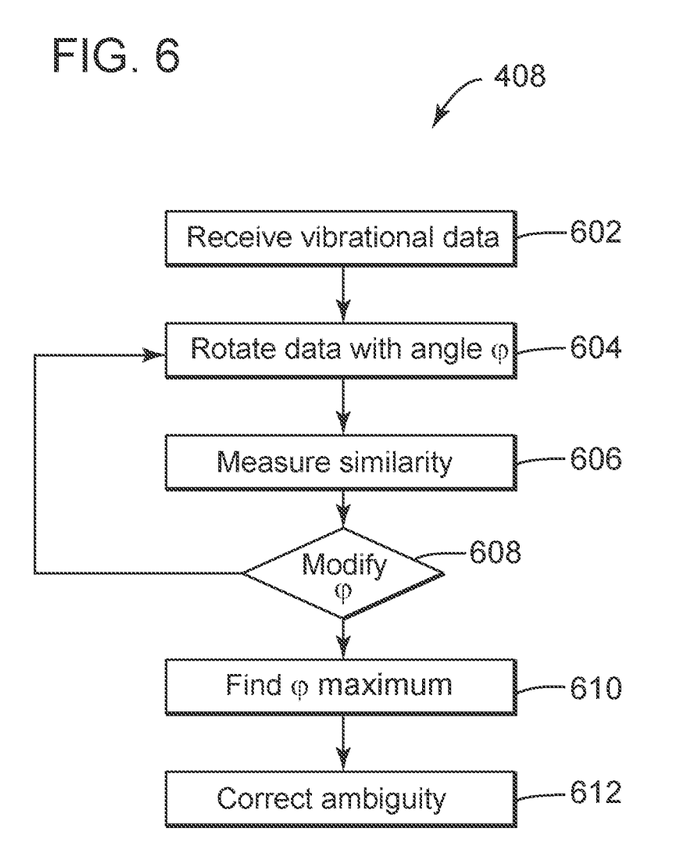
FIG. 6 is a flowchart of a method for calculating an angle between the sensing axes of a particle motion sensor and a gravity sensing sensor.

Thus, step 408 includes the following sub-steps. The vibrational data recorded along axes $Y_t$ and $Z_t$ by the gravity sensing sensors 340 is received in step 602, this data is rotated in step 604 with an angle φ around axis $X=X_t=X_0$, with a given value between zero and π radians, e.g., one radian, and a similarity is calculated in step 606, between $AccY_φ(t)$ and PMSY(t) and/or $AccZ_φ(t)$ and PMSZ(t), i.e., between (i) the data recorded by the gravity sensing sensors rotated by angle φ and (ii) the data recorded by the particle motion sensors.

The rotation by angle φ in step 604 can be performed based on equation:

$$\begin{pmatrix} AccY_\varphi(t) \\ AccZ_\varphi(t) \end{pmatrix} = \begin{pmatrix} \cos \varphi & \sin \varphi \\ -\sin \varphi & \cos \varphi \end{pmatrix} \times \begin{pmatrix} AccYt(t) \\ AccZt(t) \end{pmatrix}. \tag{8}$$

Then, in step 608 the value of angle φ is increased and the method returns to step 604 to rotate the data with the new value. The method calculates in step 606 another similarity of the newly rotated data and the seismic data and this process continues until angle φ has taken a set of values between zero and π radians. Then, in step 610 a $φ_{max}$ is calculated as the value that maximizes the similarity between the vibrational data and the seismic data. Depending on the method chosen to calculate the maxima, the similarity calculation step may produce two maxima between −π and π. Thus, in step 612 this ambiguity is solved by using, for example, the sign of the cross-correlation near 0. In this way, the value of $φ_{max}$ may be corrected by π radians if needed.

Regarding step 606, if the particle motion sensor is an accelerometer, the seismic data can be used directly to calculate the similarity. With a geophone, the seismic data may have to be differentiated first.

The similarity calculating step can use a cross-correlation or the sum of the magnitude-squared coherence in the frequency band, where the power spectral density of transverse accelerations offers a good SNR. Other mathematical functions may be used to calculate the similarity.

For a given arrangement of the gravity sensing sensors, $φ_{max}$ corresponds to the averaged value $\hat{φ}$ for the given seismic data set.

In one embodiment, if it is considered that angle φ is varying very slowly, and if sliding temporal windows (typically of a few s) are used together with appropriate filtering or interpolation, successive values of $φ_{max}$ can be combined to obtain a good estimation $\hat{θ}(t)$ of θ(t).

Returning to FIG. 4, having the calculated value $\hat{α}(t)$ of angle α(t) from step 406 and the calculated value $\hat{θ}(t)$ of angle θ(t) from step 408, step 410 calculates the value $\hat{β}(t)$ of angle β(t) as follows:

$$\hat{\beta}(t) = \hat{\alpha}(t) - \hat{\theta}(t). \tag{9}$$

This angle can be calculated with a certain frequency during the seismic survey. For example, in one application, the angle β(t) is calculated once a day. A shorter or longer time interval may be used to calculate this angle.

Then, step 410 uses this value of angle β(t) to rotate the recorded raw seismic data to prepare it for processing, based on equation:

$$\begin{pmatrix} PMSY_0(t) \\ PMSZ_0(t) \end{pmatrix} = \begin{pmatrix} \cos \hat{\beta}(t) & \sin \hat{\beta}(t) \\ -\sin \hat{\beta}(t) & \cos \hat{\beta}(t) \end{pmatrix} \times \begin{pmatrix} PMSY(t) \\ PMSZ(t) \end{pmatrix}. \tag{10}$$

Figure 7:
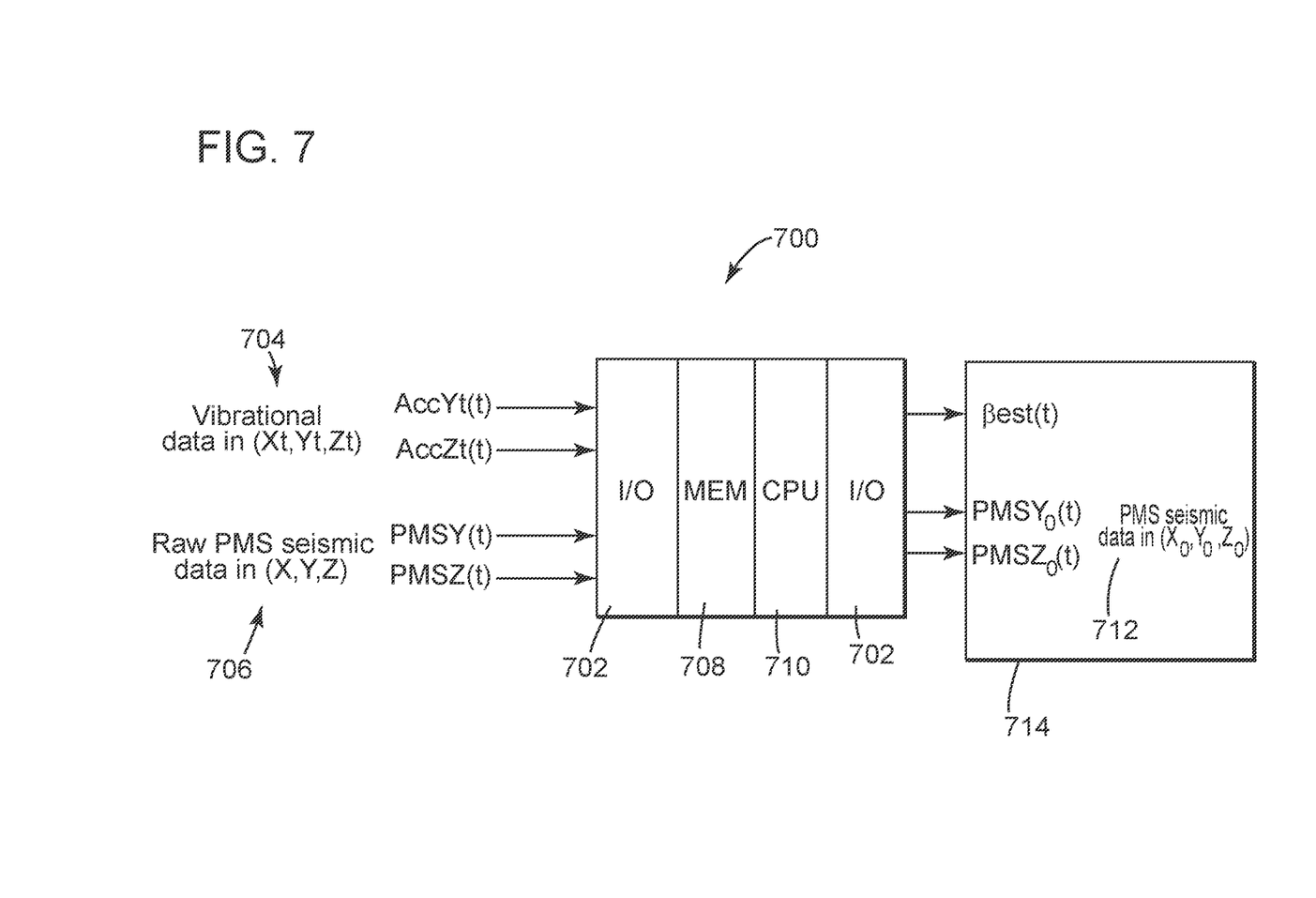
FIG. 7 is a schematic of a controller that can run one or more methods discussed herein.

As discussed above, these methods may be implemented in a controller 700 as illustrated in FIG. 7. Controller 700 may include an input/output interface 702 that is configured to receive the vibrational data 704 recorded by the gravity sensing sensor, and the raw seismic data 706 recorded by the particle motion sensors. This data may be stored in storing unit 708 prior to being processed by a processing unit 710. Processing unit 710 may be programmed to perform any of the steps previously discussed. A result of the method run by the processing unit is outputted as being the angle β(t) and/or the rotated seismic data 712 in the generic system of coordinates ($X_0$, $Y_0$, $Z_0$). The same processing unit may generate an image of the earth, based on the rotated seismic data 712 and display the same on a monitor 714.

The methods discussed herein overcome the drawbacks of the traditional systems noted in the Background section, by continuously (e.g., every minute, every hour, or every day) measuring the relative position of the gravity sensing sensors and the particle motion sensors, calculating the angle difference between their Z axes, and rotating the recorded raw seismic data with the calculated angle difference as illustrated, for example, in equation (10).

Thus, this technique does not require a precise calibration procedure for the sensors during the manufacturing process or prior to conducting the seismic survey, as the traditional surveys do. In other words, because the angle between the sensing axes of the gravity sensing sensor and the particle motion sensor is estimated continuously, the vector fidelity of the particle motion sensor is optimized and the streamer does not need to be calibrated periodically.

The disclosed embodiments provide a computing device and a method for calculating a rotation angle between two types of sensors and rotating the data recorded by one of these sensors with the rotation angle. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for rotating recorded seismic data, the method comprising:
    receiving raw seismic data recorded with a particle motion sensor that cannot sense gravity and is located along a streamer;
    receiving vibrational data recorded by a gravity sensing sensor that senses gravity and is also located along the streamer;
    calculating an angle $\beta(t)$, which varies in time, t, and is defined by a Z axis of the particle motion sensor and a $Z_0$ axis of a global orthogonal system of coordinates, based on (1) an angle $\alpha(t)$, which varies in time and is defined by a $Z_t$ axis of the gravity sensing sensor and the $Z_0$ axis, and (2) an angle $\theta(t)$ which varies also in time and is defined by the $Z_t$ axis and the Z axis, wherein the Z axis is part of a first local orthogonal system of coordinates attached to the particle motion sensor, the $Z_0$ axis is part of a global orthogonal system of coordinates attached to the earth, and the $Z_t$ axis is part of a second local orthogonal system of coordinates attached to the gravity sensing sensor; and
    correcting the raw seismic data by rotating the raw seismic data, recorded in the first local orthogonal system of coordinates, with the angle $\beta(t)$, to obtain corrected seismic data in the global orthogonal system of coordinates,
    wherein the first and second local system of coordinates share a same X axis but the other two axes of each of the first and second local systems are offset from each other by the angle $\theta(t)$ while the streamer moves in water as the raw seismic data and the vibrational data are recorded,
    wherein the global orthogonal system of coordinates share the same X axis with the first and second local systems, and
    wherein the global orthogonal system is fixed to the earth while the first and second local systems rotate with the streamer.

2. The method of claim 1, further comprising:
    generating an image of a subsurface of the earth based on the corrected seismic data.

3. The method of claim 1, further comprising:
    calculating the angle $\alpha(t)$ by using the vibrational data, but not the seismic data.

4. The method of claim 3, further comprising:
    applying a temporal filter to the vibrational data so that gravity related data is maintained and transverse motion related data is removed; and
    calculating the angle $\alpha(t)$ based only on the gravity related data.

5. The method of claim 3, further comprising:
    applying a frequency-wavenumber filter to the vibrational data recorded by (1) the gravity sensing sensor and (2) another gravity sensing sensor, to obtain gravity related data; and
    calculating the angle $\alpha(t)$ based only on the gravity related data.

6. The method of claim 1, further comprising:
    calculating the angle $\theta(t)$ based on the seismic data and the vibrational data.

7. The method of claim 6, further comprising:
    rotating the vibrational data with a given angle $\varphi$;
    calculating a similarity between the seismic data and the rotated vibrational data;
    continuing to rotate the vibrational data with a larger angle $\varphi$ and also calculating a new similarity;
    determining a value of the angle $\varphi$ that maximizes the similarity; and
    using the value of the angle $\varphi$ that maximizes the similarity as the angle $\theta(t)$.

8. The method of claim 1, further comprising:
    calculating the angle $\beta(t)$ as a difference or a sum of the angle $\alpha(t)$ and the angle $\theta(t)$.

9. The method of claim 1, wherein the seismic data includes information about a displacement, velocity or acceleration of a particle due to seismic waves.

10. The method of claim 1, wherein the vibrational data includes information about a vibration experienced by the streamer not due to seismic waves.

11. The method of claim 1, wherein the gravity sensing sensor does not record seismic data.

12. A system for acquiring seismic data, comprising:
    a multi-sensor streamer having a particle motion sensor for recording seismic data and a gravity sensing sensor for recording vibrational data, wherein the particle motion sensor cannot sense gravity and the gravity sensing sensor senses gravity; and
    a controller configured to,
    calculate an angle $\beta(t)$, which varies in time, t, and is defined by a Z axis of the particle motion sensor and a $Z_0$ axis of a global orthogonal system of coordinates, based on (1) an angle $\alpha(t)$, which varies in time and is defined by a $Z_t$ axis of the gravity sensing sensor and the $Z_0$ axis, and (2) an angle $\theta(t)$ which varies in time and is defined by the $Z_t$ axis and the Z axis,
    wherein the Z axis is part of a first local orthogonal system of coordinates attached to the particle motion sensor, the $Z_0$ axis is part of a global orthogonal system of coordinates attached to the earth, and the $Z_t$ axis is part of a second local orthogonal system of coordinates attached to the gravity sensing sensor, and correct the raw seismic data by rotating the raw seismic data, recorded in the first local orthogonal system of coordinates, with the angle β(t), to obtain corrected seismic data in the global orthogonal system of coordinates, wherein the first and second local system of coordinates share a same X axis but the other two axes of each of the first and second local systems are offset from each other by the angle θ(t) while the streamer moves in water and records the raw seismic data and the vibrational data, wherein the global orthogonal system of coordinates share the same X axis with the first and second local systems, and wherein the global orthogonal system is fixed to the earth while the first and second local systems rotate with the streamer.

13. The system of claim 12, wherein the controller is further configured to, calculate the angle α(t) by using the vibrational data, but not the seismic data.

14. The system of claim 13, wherein the controller is further configured to, apply a temporal filter to the vibrational data so that gravity related data is maintained and transverse motion related data is removed; and calculate the angle α(t) based only on the gravity related data.

15. The system of claim 13, wherein the controller is further configured to:

apply a frequency-wavenumber filter to the vibrational data recorded by (1) the gravity sensing sensor and (2) another gravity sensing sensor, to obtain gravity related data; and calculate the angle α(t) based only on the gravity related data.

16. The system of claim 12, wherein the controller is further configured to:

calculate the angle θ(t) based on the seismic data and the vibrational data.

17. The system of claim 16, wherein the controller is further configured to:

rotate the vibrational data with a given angle φ;

calculate a similarity between the seismic data and the rotated vibrational data;

continue to rotate the vibrational data with a larger angle φ and also calculating a new similarity;

determine a value of the angle φ that maximizes the similarity; and use the value of the angle φ that maximizes the similarity as the angle θ(t).

18. The system of claim 12, wherein the seismic data includes information about a displacement, velocity or acceleration of a particle due to seismic waves and the vibrational data includes information about a vibration experienced by the streamer not due to seismic waves.

19. A system for acquiring seismic data, comprising:

a multi-sensor streamer having a particle motion sensor for recording raw seismic data and a gravity sensing sensor for recording vibrational data, wherein the particle motion sensor cannot sense gravity and the gravity sensing sensor senses gravity; and a controller configured to, calculate an angle β(t), which varies in time, t, and is defined by a Z axis of the particle motion sensor and a $Z_0$ axis of a global orthogonal system of coordinates, based on (1) an angle α(t), which varies in time and is defined by a $Z_t$ axis of the gravity sensing sensor and the $Z_0$ axis, and (2) an angle θ(t), which also varies in time and is defined by the $Z_t$ axis and the Z axis, wherein the Z axis is part of a first local orthogonal system of coordinates attached to the particle motion sensor, the $Z_0$ axis is part of a global orthogonal system of coordinates attached to the earth, and the $Z_t$ axis is part of a second local orthogonal system of coordinates attached to the gravity sensing sensor, and correct the raw seismic data by rotating the raw seismic data, recorded in the first local orthogonal system of coordinates, with the angle β(t), to obtain corrected seismic data in the global orthogonal system of coordinates.

* * * * *